United States Patent [19]

Harrington

[11] Patent Number: 5,011,119

[45] Date of Patent: Apr. 30, 1991

[54] CONVENIENTLY ATTACHED HYDRAULIC TRAILER JACK

[76] Inventor: Robert L. Harrington, P.O. Box 9448, Midland, Tex. 79708

[21] Appl. No.: 470,098

[22] Filed: Jan. 25, 1990

[51] Int. Cl.⁵ .............................................. B60S 9/02
[52] U.S. Cl. ................................................... 254/420
[58] Field of Search ............................... 254/118–420, 254/423, 93 H, 45; 280/763.1, 764.1, 765.1, 766.1

[56] References Cited

U.S. PATENT DOCUMENTS

| | | | |
|---|---|---|---|
| 2,416,796 | 3/1947 | Dobbs ................................. | 254/423 |
| 2,546,203 | 3/1951 | Tucker ................................ | 254/423 |
| 2,885,181 | 5/1959 | McCully et al. ................... | 254/420 |
| 3,273,858 | 9/1966 | Coburn . | |
| 3,341,179 | 9/1967 | Smith . | |
| 3,387,821 | 6/1968 | Saddler . | |
| 3,425,714 | 2/1969 | Morris ................................. | 254/420 |
| 3,817,493 | 6/1974 | Hanser . | |
| 3,841,663 | 10/1974 | Proffit ................................. | 254/420 |
| 3,863,894 | 2/1975 | Mansi et al. ........................ | 254/420 |
| 4,169,579 | 10/1979 | Moll ................................... | 254/420 |
| 4,213,627 | 7/1980 | Thompson . | |

Primary Examiner—Robert C. Watson
Attorney, Agent, or Firm—Richards, Medlock & Andrews

[57] ABSTRACT

A hand-operated hydraulic jack rotatably mounted on a trailer to assist in removably attaching the trailer to the hitching mechanism of a towing vehicle. The jack can be rotated to a vertical position and hydraulically actuated with a hand-operated pump to lift or lower the trailer tongue relative to the hitching mechanism. Once the trailer is attached to the hitching mechanism or is otherwise being adequately supported, the jack can be retracted by opening a thumbscrew valve on the hydraulic circuiting body to allow the hydraulic fluid to move through the return circuit back to the hydraulic fluid reservoir in the jack. The jacks's actuator is retracted by means of springs at the sides of the jack. With the tongue of the trailer supported and the jack retracted, the jack may then be rotated to its horizontal position to provide maximum ground clearance.

21 Claims, 2 Drawing Sheets

CONVENIENTLY ATTACHED HYDRAULIC TRAILER JACK

TECHNICAL FIELD OF THE INVENTION

This invention relates in general to an apparatus that is connected to the tongue of a trailer for hydraulically lifting the trailer tongue so that the trailer can be mechanically attached to or removed from a bumper or other type of hitching mechanism of a towing vehicle.

BACKGROUND OF THE INVENTION

There a number of mechanisms for supporting the front end or "tongue" of a trailer vehicle when the trailer is disengaged. These support mechanisms provide trailer support at a fixed height by means of vertical support members of rigidly fixed lengths. In addition, lifting mechanisms are commonly practiced whereby hydraulic jacks are securely fixed to trailers for vertical extension of leg assemblies. It has been necessary to manually adjust the length of the support members in order to adjust the height of the trailer support. Alternatively, the hydraulically activated jacks which are rigidly fixed to the trailer body must be attached at a sufficient height so that the retracted leg assembly will clear ground obstacles. Further problems associated with the automatic hydraulic jacks include the cost and mechanical complexity of automatic jacks, as compared to hand pumped jacks.

It is therefore an objective of the present invention to provide an improved hydraulic jack mechanism which will be easier and quicker to operate than the mechanisms of the current art. It is also an objective of the present invention to provide an improved hydraulic jack mechanism which can be conveniently stored while the trailer is being towed.

SUMMARY OF THE INVENTION

The invention provides a hydraulic lifting mechanism or trailer jack which is rotatably attached to a flange which in turn is attached to the tongue of a trailer which is to be lifted. The hydraulic trailer jack has a hand pump for hydraulically extending an extension piece against a weight-bearing surface so that the hydraulic trailer jack, as well as the trailer tongue to which the jack is attached via a flange and bracket connector, is lifted up relative to the weight bearing surface. The flange and bracket combine to form a rotatable connector which allows the hydraulic jack to be retracted and rotated to a horizontal position when the trailer has been attached for towing.

The flange, which is connected to the tongue of the trailer, is essentially a plate in which is formed a cylindrical element. The cylindrical element rotatably engages a hole formed in the bracket, which is itself connected to the hydraulic circuiting body. It is the flange and bracket combination which allows the hydraulic jack to be rotated and locked into a horizontal "traveling" position.

The hydraulic circuiting body, which causes the extension piece to extend and thereby lift the jack and trailer tongue, comprises a plurality of chambers which are interconnected by valves to establish unidirectional fluid flow in response to the hand pump pressurization of one of the chambers. The extension piece is slidably mounted in the chamber to which the fluid is ultimately pumped so that the extension piece will slidably extend in response to increased pressurization.

BRIEF DESCRIPTION OF THE DRAWINGS

For a more complete understanding of the present invention and the advantages thereof, reference is made to the following description of the accompanying drawings in which.

DETAILED DESCRIPTION OF THE INVENTION

With reference to the drawings, there is depicted a novel hydraulic jack 35 of the present invention to assist in connecting and disconnecting a trailer 36 and a hitching mechanism 40 of a towing vehicle.

Figure 1:
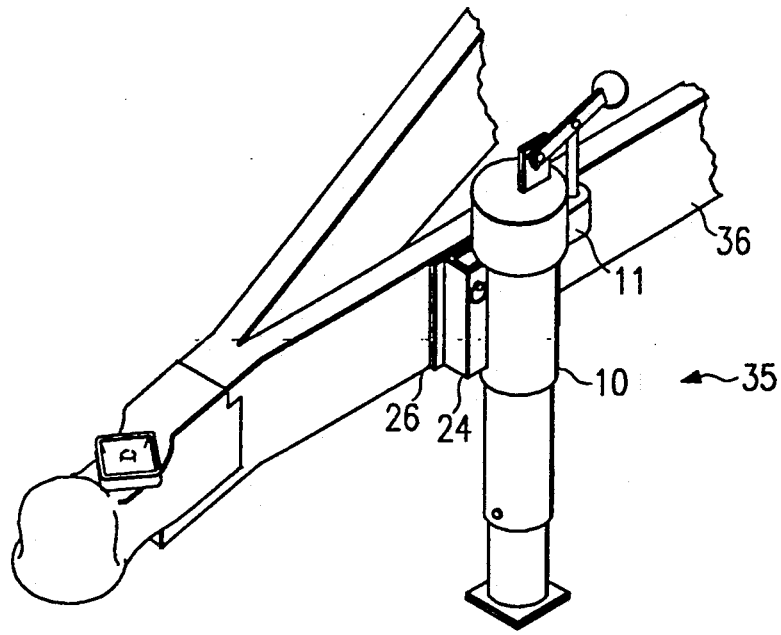
FIG. 1 shows an installed jack in accordance with the present invention in the vertical position to facilitate attachment of the trailer to a hitching mechanism.

FIG. 1 shows the hydraulic jack 35 of the preferred embodiment of the present invention which is rotated down into a vertical position for trailer storage or for facilitating trailer attachment to or removal from a trailer hitching mechanism.

Figure 2:
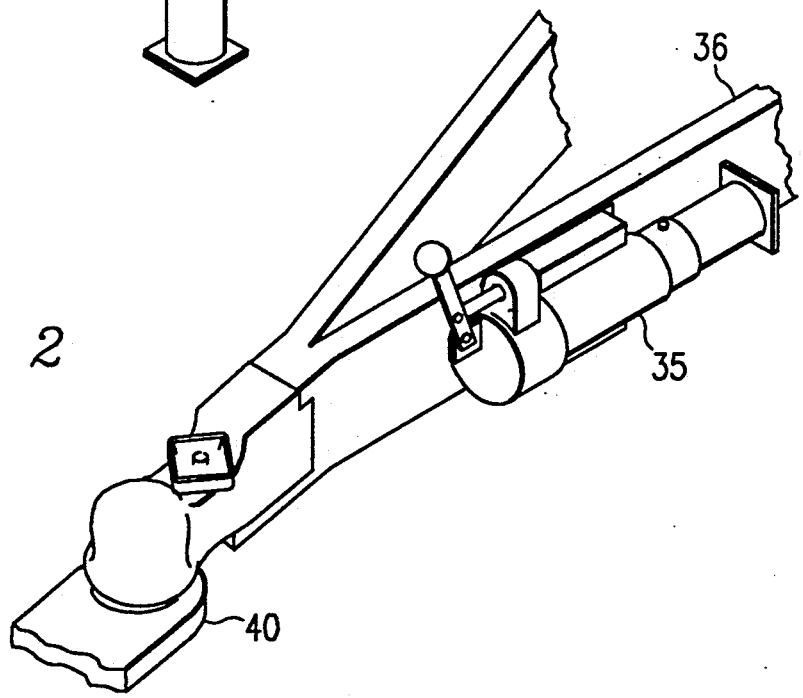
FIG. 2 shows a trailer connected to a hitching mechanism with the jack installed in accordance with the present invention in the horizontal position to facilitate the towing of the connected trailer and towing vehicle.

FIG. 2 shows the hydraulic jack 35 which is rotated to the horizontal position after the trailer tongue 36 has been attached to the hitching mechanism 40. In this horizontal position, the trailer 36 can be towed without having the hydraulic jack 35 scrape the road.

Figure 4A:
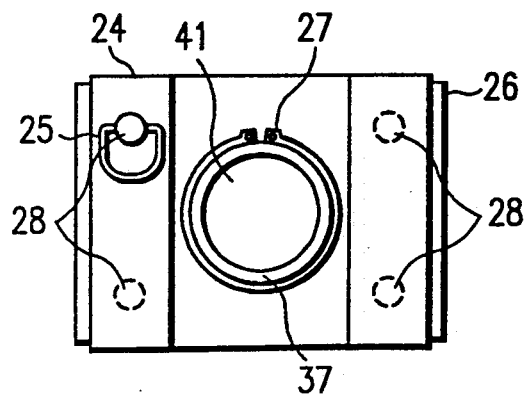
FIG. 4A shows a mounting bracket and flange with the locking pin in elevation view.
Figure 3:
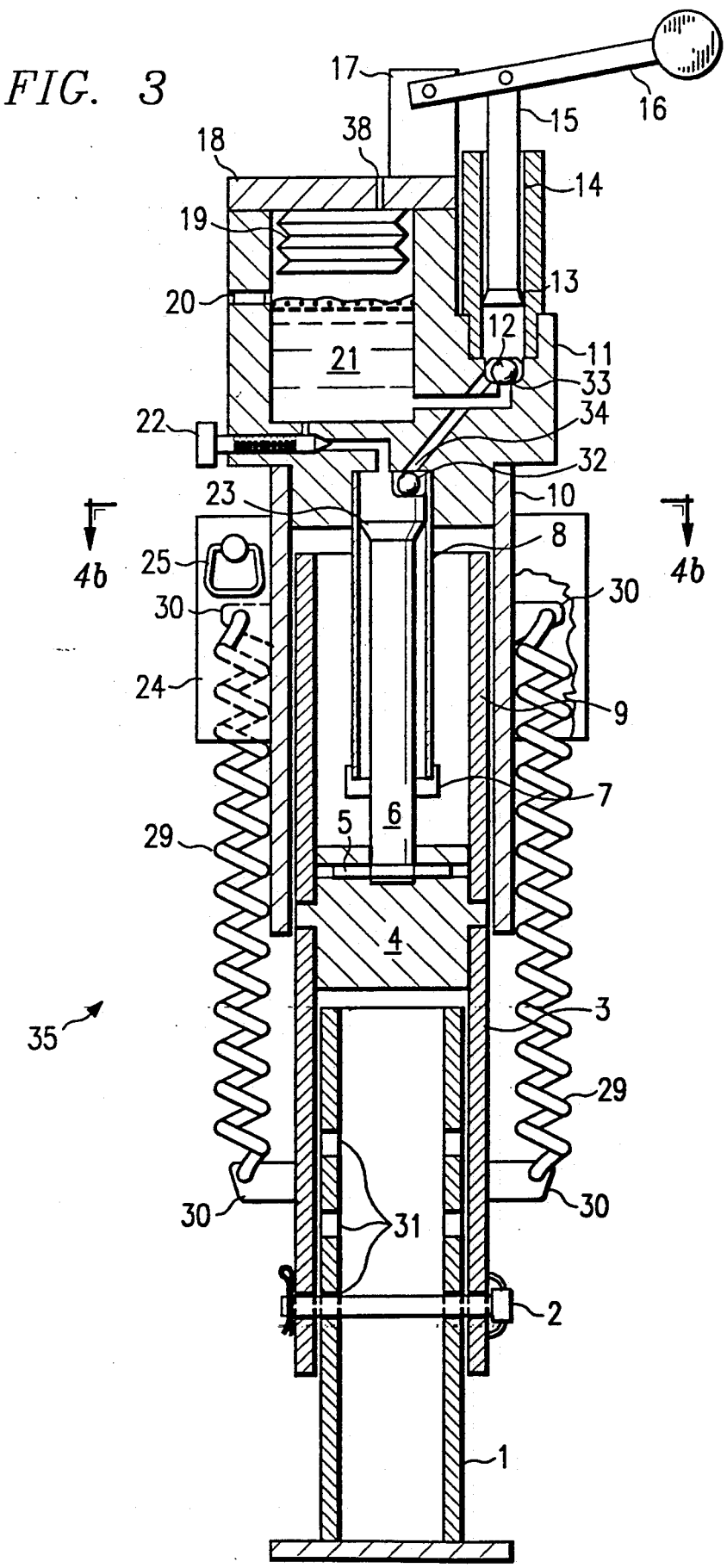
FIG. 3 shows an elevational cross section view of one embodiment of the present invention.

In FIG. 3, there is shown a hydraulic fluid circuiting body 11 in which the hydraulic fluid flows from the fluid reservoir chamber 21 to the pumping cavity chamber 14 to the actuator containment tube 8 and back to the reservoir chamber 21. The circuiting body 11 is rigidly fixed to an elongated cylindrical tube 10 which is itself rigidly fixed to a bracket 24. The width of the bracket 24 extends well beyond the diameter of the centrally mounted cylindrical tube 10 and the length of the bracket 24 extends substantially along the length of the cylindrical tube 10. The rectangular configuration of the bracket 24 having a centrally located hole 41 is shown in FIG. 4A. Bracket 24 provides two functions: (1) the bracket 24 provides a weight transferring path for the weight of the trailer 36 to the jack 35 and ultimately to the load-bearing agent, and (2) the bracket 24 is rotatably coupled to a flange plate 26 which is itself rigidly fixed to a part of the trailer 36. Extending perpendicularly from the plane of the flange 26 is a short cylindrical element 37 of sufficient length to extend through a centrally located hole 41 in the bracket 24. The hole 41 has a slightly larger diameter than the protruding cylindrical element 37 of the flange 26 so as to permit engagement therebetween for purposes of allowing rotation of the jack 35 between the vertical weight-bearing position and the horizontal traveling position. Bracket 24 is rotatably secured to cylindrical element 37 of flange 26 by snap-ring 27. As shown in FIGS. 1 and 2, the flange 26 and bracket 24 form a rotatable connector which is suitable for attachment to the outer frame of the tongue of a trailer, thereby permitting convenient attachment and easy access to the jack 35.

Figure 4B:
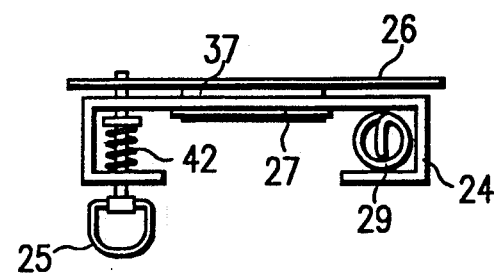
FIG. 4B shows a mounting bracket and flange with the locking pin in plan view.

As shown in FIGS. 4A and 4B, a spring-loaded locking pin 25 is captively engaged by the bracket 24 and bracket spring 42. Bracket 24 can be rotated with respect to flange 26 so long as the pin 25 does not extend into any of the designated holes 28 in the flange 26. However, if the pin 25 extends through any of the designated holes 28, the bracket 24, and therefore the jack 35, is secured against rotation with respect to the flange 26. The jack 35 can be secured by the locking pin 25 in a vertical position normal to the ground which would typically be used to lift or lower the tongue of the trailer. Alternatively, the jack 35 can be rotated and secured by means of the locking pin 25 in a horizontal position which would be the position typically used for traveling when the tongue of the trailer is otherwise supported. See FIG. 2.

When the jack 35 is in the vertical, weight-bearing position, the path of weight transfer proceeds from the flange 26 (which is rigidly fixed to the trailer 36), through the bracket 24, through the elongated tube 10, and to the hydraulic circuiting body 11 which is mechanically coupled to the actuator containment tube 8 and the actuator seal/nut 7. These parts are mechanically connected to form the first parts group of the jack assembly's weight-bearing path.

The second parts group of the jack assembly's weight-bearing path, collectively referred to as the extension member or extension piece, is also rigidly assembled by mechanical means. This second group includes a rigid cylindrical foot tube 1 whose function is to transfer the weight to the ultimate weight-bearing agent (i.e., the ground). Foot tube 1 is received inside of a cylindrical lower shaft 3. Relative motion of the foot tube 1 and lower shaft 3 is limited to rotational and lengthwise axial movement as the foot tube 1 moves into and out of the lower shaft 3. The foot tube and lower shaft are secured against rotational and lengthwise movement by aligning a locating hole 31 in foot tube 1 with a hole in the lower shaft 3 and inserting pin 2 through the aligned holes. Lower shaft 3 is coupled to upper shaft 9 through coupling 4 to comprise, collectively, the cylindrical shaft. The cylindrical shaft is secured to actuator 6 by means of pin 5. As noted above, the second group of jack parts has the same mechanical integrity of assembly as the first group.

Relative motion of the two parts groups is constrained to a lengthwise axial movement. The load-bearing functions of each parts group are coupled together by means of hydraulic fluid whose load-bearing integrity is maintained by upper seal 13 and lower seal 23, upper fluid check ball 12 and lower fluid check ball 32 (together with their respective seats 33 and 34), and the hydraulic circuiting body 11. With the thumbscrew valve 22 closed to shut off the third passageway, the reservoir 21 and actuator containment tube 8 are shut off from one another so that hydraulic fluid may be pumped from the fluid reservoir 21 through a first passageway to the pumping cavity 14, and then through a second passageway into the actuator containment tube 8 by means of handle 16 pivoting about block 17 to alternately lift and lower pump actuator 15 in the pumping cavity 14. The pumping action of this block and lever pump causes the hydraulic fluid to flow from the hydraulic fluid reservoir 21 through the pumping cavity chamber 14 and to the jack actuator containment tube 8. This flow is maintained by the ball valve arrangement comprised of hydraulic fluid check balls 12 and 32. As the pump actuator 15 is lifted, the lower fluid check ball 32 is engaged in seat 34 while simultaneously the upper fluid check ball 12 is relieved from seat 33. The pumping cavity is thus filled with hydraulic fluid drawn from hydraulic fluid reservoir 21 until the actuator 15 ceases the lifting motion. Block 17 can be designed to stop the lifting motion at a designated point.

As the actuator 15 is lowered, the upper fluid check ball 12 is engaged in seat 33 and simultaneously the lower fluid ball 32 is relieved from seat 34, thus permitting flow of the hydraulic fluid from the pumping cavity 14 to the jack actuator containment tube 8. The introduction of hydraulic fluid into actuator containment tube 8 displaces the jack actuator 6 into an extended position. As the pumping action is continued, the hydraulic jack lifts the tongue of the trailer until the jack actuator reaches the position of maximum displacement. This maximum displacement can be designed into the jack apparatus. It should be appreciated by those skilled in the art that other valve means can also be used with the present invention.

The jack actuator 6 and the remainder of the second parts group may be retracted from the extended position by opening thumbscrew valve 22 so that hydraulic fluid can flow from the now pressurized jack actuator containment tube 8 to the hydraulic fluid storage reservoir 21. Two springs 29, each attached between a lug 30 on the lower shaft 3 and a lug 30 on the elongated tube 10, provide additional retractive force to retract the second parts group.

Hydraulic fluid reservoir cap 18 provides a mechanical clamp to secure the flexible bellows 19 against the hydraulic circuiting body 11. The reservoir cap 18 also provides a designed vent hole 38 which gives the flexible bellows 19 the ability to move with the level of hydraulic fluid in the hydraulic fluid reservoir 21. During operations of extending or retracting the jack, flexible bellows 19 are designed to maintain a seal between the hydraulic fluid and the hydraulic circuiting body 11 while giving freedom of motion to the level of hydraulic fluid in the reservoir 21 without creating a vacuum in the hydraulic fluid reservoir 21. The flexible bellows 19 also prevent leakage of the hydraulic fluid through the vent hole 38 when the jack is rotated into the horizontal traveling position.

Access to the hydraulic reservoir 21 is provided through port hole 20 to permit the filling of hydraulic fluid to the proper level needed for jack operation.

In summary, there has been disclosed a hand pumped hydraulic trailer jack which is rotatably attached to the trailer tongue. Although one embodiment of the invention has been illustrated in the accompanying drawings and described in the foregoing Detailed Description, it will be understood that the invention is not limited to the embodiment disclosed, but is capable of numerous rearrangements, modifications, and substitutions without departing from the scope of the invention.

What is claimed is:

1. A hydraulic trailer jack, comprising:
 a flange plate;
 a bracket rotatably connected to the flange plate;
 a hydraulic fluid circuiting body mechanically connected to the bracket comprising,
  a plurality of chambers formed in the circuiting body for receiving fluid, including a reservoir chamber which is capped by a flexible bellows, a pumping cavity chamber, and an actuator containment tube chamber;

a valve system for establishing a directional flow of fluid through the chambers;

a pump actuator slidably engaged within the pumping cavity chamber to thereby form a pump for differentially pressurizing the various chambers; and an extension member slidably engaged within at least one of the chambers of the circuiting body.

2. The hydraulic trailer jack as defined in claim 1, wherein the flange plate comprises a cylindrical element for rotatable engagement with the bracket and further includes a plurality of designated holes.

3. The hydraulic trailer jack as defined in claim 2, wherein a hole is formed in the bracket for rotatable engagement with the cylindrical element and wherein the bracket captively engages a pin which can extend through any of the designated holes in the flange plate so as to lockingly engage the bracket to the flange plate.

4. The hydraulic trailer jack as defined in claim 1, wherein the pumping cavity chamber is connected to the reservoir chamber by a first passageway, and the actuator containment tube chamber is connected to the pumping cavity chamber by a second passageway and is connected to the reservoir chamber by a third passageway.

5. The hydraulic trailer jack as defined in claim 4, wherein a block and lever pump arrangement is rigidly fixed to the circuiting body and rotatably attached to the pump actuator, said pump actuator to be alternately raised and lowered in the pumping cavity chamber.

6. The hydraulic trailer jack as defined in claim 5, wherein the valve system comprises:

a thumbscrew valve for manually opening or closing the third passageway; and a ball valve arrangement for establishing fluid flow from the reservoir chamber to the pumping cavity chamber through the first passageway when the pump actuator is lifted and for establishing flow from the pumping cavity chamber to the actuator containment tube chamber through the second passageway when the pump actuator is lowered.

7. The hydraulic trailer jack as defined in claim 1, wherein an elongated, cylindrical tube is coupled to the circuiting body; and an actuator containment tube is coupled to the actuator containment tube chamber and concentrically located within one end of the elongated, cylindrical tube.

8. The hydraulic trailer jack as defined in claim 7, wherein the extension member comprises an actuator which is capped on one end by a seal, said actuator being slidably and concentrically engaged within the actuator containment tube, said actuator further being concentrically disposed within and attached to a cylindrical shaft which has a larger diameter than the actuator containment tube so as to concentrically enclose the actuator containment tube but which is concentrically and slidably fitted within the elongated, cylindrical tube.

9. The hydraulic trailer jack as defined in claim 8, wherein the extension member further comprises a cylindrical foot tube concentrically disposed within and adjustably fixed to the cylindrical shaft.

10. The hydraulic trailer jack as defined in claim 1, wherein a pair of springs retractably connect the extension member to the circuiting body.

11. A conveniently attached trailer and hydraulic lifting mechanism system for lifting a trailer, comprising:

a rotatable connector fixedly connected to an outward facing surface of an outer frame of a tongue on the trailer wherein the connector comprises a flange plate and a cylindrical element, said flange plate being fixedly attached to the outer frame of the tongue of the trailer, and a bracket rotatably connected to the cylindrical element of the flange plate;

a hydraulic fluid circuiting body mechanically connected to the bracket comprising, a plurality of interconnected chambers for receiving and containing fluid;

a valve system for establishing directional flow of fluid through the chambers;

a means for pressurizing at least one of the chambers; and an extension piece slidably mounted in one of the chambers of the hydraulic fluid circuiting body.

12. The trailer and hydraulic lifting mechanism system as defined in claim 11, wherein the plurality of chambers comprises:

a first reservoir chamber which is mechanically capped by a flexible bellow, said flexible bellow having provided therein a vent hole to enable the flexible bellows to move with the level of hydraulic fluid in the reservoir chamber, a pumping chamber, and an actuator containment tube chamber in which is slidably disposed the extension piece.

13. The trailer and hydraulic lifting mechanism system as defined in claim 12, wherein the extension piece comprises an actuator which is capped on one end by a seal, said actuator being slidably and concentrically engaged within the actuator containment tube chamber, said actuator further being concentrically disposed within and attached to a cylindrical shaft.

14. The trailer and hydraulic lifting mechanism system as defined in claim 13, wherein the extension piece further comprises a cylindrical foot tube concentrically disposed within and adjustably fixed to the cylindrical shaft.

15. A hydraulic trailer jack for lifting the tongue of a trailer, comprising:

a flange in which is formed a plurality of designated holes and in which is formed a perpendicularly extending cylindrical element;

a bracket having a centrally located hole suitable for rotatably engaging said cylindrical element, said bracket captively engaging a locking pin which can extend through any of the designated holes in the flange so as to lockingly engage the bracket to the flange;

a hydraulic fluid circuiting body rigidly connected to the bracket comprising, a reservoir which is mechanically capped by a flexible bellow, a pumping cavity, and an actuator containment tube chamber in which is disposed an actuator containment tube, said pumping cavity and actuator containment tube being connected by a second passageway, said actuator containment tube and reservoir being connected by a third passageway, and said reservoir and pumping cavity being connected by a first passageway;

a block and lever pump arrangement rigidly fixed to the circuiting body and rotatably attached to a pump actuator, said pump actuator being slidably engaged within the pumping cavity, and said pump actuator to be alternately raised and lowered in the pumping cavity;

a thumbscrew valve for manually opening or closing the third passageway between the reservoir and the actuator containment tube;

a first ball valve connected to the first passageway between the reservoir and the pumping cavity, and a second ball valve connected to the second passageway between the pumping cavity and the actuator containment tube for establishing fluid flow from the reservoir to the pumping cavity when the pump actuator is lifted and for establishing flow from the pumping cavity to the actuator containment tube when the pump actuator is lowered;

an elongated, cylindrical tube mechanically attached to the circuiting body so as to concentrically encircle the actuator containment tube;

an extension member comprising,
  an actuator slidably and concentrically engaged within the actuator containment tube,
  a cylindrical shaft concentrically disposed between the actuator containment tube and the elongated, cylindrical tube so as to be slidably fitted within the elongated, cylindrical tube, said cylindrical shaft being mechanically attached to the actuator, and
  a cylindrical foot tube concentrically disposed within and adjustably fixed to the cylindrical shaft; and a pair of springs retractably connecting the extension member to the circuiting body.

16. A hydraulic trailer jack, comprising:
a flange plate;
a bracket rotatably connected to the flange plate;
a hydraulic fluid circuiting body mechanically connected to the bracket comprising,
  a plurality of chambers formed in the circuiting body for receiving fluid including a reservoir chamber capped by a flexible bellows, a pumping cavity chamber connected to the reservoir chamber by a first passageway, and an actuator containment tube chamber connected to the pumping cavity chamber by a second passageway and connected to the reservoir chamber by a third passageway;
a valve system for establishing a directional flow of fluid through the chambers;
a pump actuator slidably engaged within one of the chambers of the circuiting body to thereby form a pump for differentially pressurizing the various chambers; and
an extension member slidably engaged within at least one of the chambers of the circuit body.

17. The hydraulic trailer jack as defined in claim 16, wherein a block and lever pump arrangement is rigidly fixed to the circuiting body and rotatably attached to the pump actuator, said pump actuator to be alternately raised and lowered in the pumping cavity chamber.

18. The hydraulic trailer jack as defined in claim 17, wherein the valve system comprises:
a thumbscrew valve for manually opening or closing the third passageway; and
a ball valve arrangement for establishing fluid flow from the reservoir chamber to the pumping cavity chamber through the first passageway when the pump actuator is lifted and for establishing fluid flow from pumping cavity chamber to the actuator containment tube chamber through the second passageway when the pump actuator is lowered.

19. A hydraulic lifting mechanism system for lifting a trailer, comprising:
a rotatable connector fixedly connected to a tongue on the trailer;
a hydraulic fluid circuiting body mechanically connected to the connector comprising,
  a plurality of interconnected chambers for receiving and containing fluid, including a first reservoir chamber which is mechanically capped by a flexible bellow, said flexible bellow having provided therein a vent hole to enable the flexible bellow to move with the level of hydraulic fluid in the reservoir chamber, a pumping chamber, and an actuator containment tube chamber;
a valve system for establishing a directional flow of fluid through the chambers;
a hand pump actuator slidably disposed within the pumping chamber for pressurizing the pumping chamber; and
an extension piece slidably mounted in the actuator containment tube chamber.

20. The trailer and hydraulic lifting mechanism system as defined in claim 19, wherein the extension piece comprises an actuator which is capped on one end by a seal, said actuator being slidably and concentrically engaged within the actuator containment tube chamber, said actuator further being concentrically disposed within and attached to a cylindrical shaft.

21. The trailer and hydraulic lifting mechanism system as defined in claim 20, wherein the extension piece further comprises a cylindrical foot tube concentrically disposed within and adjustably fixed to the cylindrical shaft.

* * * * *